United States Patent [19]

Chung et al.

[11] Patent Number: 4,596,842

[45] Date of Patent: Jun. 24, 1986

[54] ALKANOLAMINE HYDROXY-CAPPED EPOXY FOR CATHODIC ELECTROCOAT

[75] Inventors: Ding-Yu Chung, Farmington Hills; Tapan K. Debroy, Novi, both of Mich.

[73] Assignee: Inmont Corporation, Clifton, N.J.

[21] Appl. No.: 723,586

[22] Filed: Apr. 15, 1985

[51] Int. Cl.⁴ .............................................. C08L 63/00
[52] U.S. Cl. ........................ 523/414; 204/181.7; 523/415; 525/481; 525/510; 528/45; 528/74.5; 528/111; 528/361; 528/407
[58] Field of Search ............. 523/414, 415; 525/481, 525/510; 528/45, 74.5, 111, 361, 407; 204/181 C

[56] References Cited

U.S. PATENT DOCUMENTS

| | | | |
|---|---|---|---|
| 3,468,779 | 9/1969 | Slater et al. | 204/181 |
| 3,484,408 | 12/1969 | Holm | 528/111 |
| 3,922,253 | 11/1975 | Jerabek et al. | 260/77.5 |
| 3,925,180 | 12/1975 | Jerabek | 204/181 |
| 3,936,405 | 2/1976 | Sturai et al. | 260/29.2 |
| 3,962,165 | 6/1976 | Bosso et al. | 260/29.2 |
| 3,984,299 | 10/1976 | Jerabek | 204/181 |
| 4,007,154 | 2/1977 | Schimmel et al. | 260/37 |
| 4,081,343 | 3/1978 | Schimmel et al. | 204/181 |
| 4,093,594 | 6/1978 | Anderson | 260/47 |
| 4,104,147 | 8/1978 | Marchetti et al. | 204/181 |
| 4,116,900 | 9/1978 | Belanger | 260/18 |
| 4,134,864 | 1/1979 | Belanger | 260/18 |
| 4,137,140 | 1/1979 | Belanger | 260/181 |
| 4,139,510 | 2/1979 | Moriarity et al. | 204/181 |
| 4,182,831 | 1/1980 | Hicks | 528/103 |
| 4,186,124 | 1/1980 | Schimmel et al. | 260/37 |
| 4,225,478 | 9/1980 | Hicks | 260/29.2 |
| 4,225,479 | 9/1980 | Hicks | 260/29.2 |
| 4,230,552 | 10/1980 | Schimmel et al. | 204/181 |
| 4,339,369 | 6/1982 | Hicks et al. | 523/414 |
| 4,419,467 | 12/1983 | Wismer et al. | 523/416 |
| 4,432,850 | 2/1984 | Moriarity et al. | 204/181 |
| 4,468,307 | 8/1984 | Wismer et al. | 204/181 |

*Primary Examiner*—Maurice J. Welsh
*Attorney, Agent, or Firm*—Emil Richard Skula

[57] ABSTRACT

Improved electrodepositable resin compositions comprising the reaction product of an epoxide, and, the reaction product of a ketone and an alkanolamine. The introduction of a primary monoamine into the epoxide molecule can be simultaneously done, optionally, with chain extension. The resin compositions can also be used as grind resins.

14 Claims, No Drawings

ALKANOLAMINE HYDROXY-CAPPED EPOXY FOR CATHODIC ELECTROCOAT

DESCRIPTION

1. Technical Field

The field of art to which this invention pertains is epoxy resins, and, more specifically, epoxy resin compositions containing crosslinking agents for use in cathodic electrocoat processes.

2. Background Art

The use of electro depositable resin compositions in aqueous baths to coat objects is well known in the art.

Typically, a resin emulsion is prepared by initially adducting an epoxy resin with an amine. The adduct is then mixed with a crosslinking agent and salted to form an aqueous emulsion. The adduct is referred to as solubilized in that the emulsion is not a true solution. It is thought that the emulsion consists of small spheres of adduct, referred to as micelles, in which the crosslinking agent was migrated to the center of the micelle. An aqueous electrodepostion coating bath is prepared at the coating site by mixing the principal resin emulsion with a pigment paste and deionized water. The pigment paste typically comprises a cathodic electrodepositable amine-containing epoxide resin and a pigment. It is also common to include additional ingredients in the electrodeposition bath including coalescent solvents, antifoam agents, etc.

The coating bath is typically contained in an electrically insulated tank. The tank is typically constructed of carbon steel or stainless steel and coated with an acid resisting, electrically insulating coating. The tank contains an anode connected to a high voltage DC circuit. In order to coat an article, the article must be electrically conductive. The article is connected to the circuit serving as cathode. The cathode, i.e., article, typically is connected to ground. As the article is immersed in the tank, the flow of current from the anode to the cathode is commenced. As the current flows, the positively charged resin emulsion and the pigment paste are attracted to the surfaces of the article and deposited thereon forming a layer. As the thickness of the layer increases with time, the degree of insulation of the cathode increases until the current is shut off by the insulating layer.

When the desired coating thickness has been produced, the article is removed from the bath, rinsed and then cured. The coatings are typically cured by baking the article and coating at a sufficient temperature for a sufficient time to have complete crosslinking of the resin.

As previously mentioned, it is necessary in order to be able to cathodically electrodeposit the resin that a nitrogen-containing compound be adducted with the epoxide. U.S. Pat. No. 3,984,299 discloses electrodepositable cationic resin compositions in which polyepoxide is adducted with a primary or secondary amine. U.S. Pat. No. 4,104,147 discloses electrodepositable resin compositions in which the epoxy amine adduct is formed by reacting the epoxy with a triamine. U.S. Pat. No. 4,134,864 discloses cationic electrodepositable resin compositions adducted with polyamines. U.S. Pat. No. 4,093,594 discloses cathodically electrodepositable coating compositions wherein the epoxy amine adduct is formed by reacting the epoxy with excess polyamine. U.S. Pat. No. 4,432,850 discloses electrodepositable resin compositions wherein the amine epoxy adduct is formed by reacting the epoxy with polyoxyalkylene polyamines. U.S. Pat. No. 4,419,467 discloses the use of hydroxyl containing monoamines and polyamines to form the epoxy/amine adduct for a cationic electrodepositable resin composition.

There are several problems associated with the approaches of the prior art with regard to introducing a primary amine into the epoxy resin. In one approach, the polyamine is treated with ketones to form ketimines. Examples of polyamines used in this approach include are diethylene triamine and cocoamine. In this approach a secondary amine is used to react with the epoxy ring or oxirane ring, while the primary amine must be blocked. Having too much amine present in the epoxy amine adduct produces excessively high conductivity which can result in low rupture voltage problems.

The other approach is the excess amine approach. In this approach, excess amounts of polyamines are reacted with the epoxide groups in order to have free primary amine present. A disadvantage of this approach includes the difficulty in removing or stripping the excess amine from the adduct. An additional disadvantage is that an ester linkage cannot be used as an extender.

There is a constant search in the art for improved cationic electrodepositable resin compositions and improved methods of manufacturing these compositions. Due to the complexity of the reactions, including adducting the primary amine into the epoxy resin and additionally chain extending the adduct, a means of simplifying the introduction of the primary amine into the resin and optionally simultaneously chain extending and introducing the amine into the resin would be an advance in the art.

Accordingly, what is needed in the art is a method of introducing a primary monoamine into an epoxy resin molecule to form an epoxy amine adduct, wherein chain extension can be optionally simultaneously performed, and the amine content is at a minimum.

DISCLOSURE OF INVENTION

A cationic electrodepositable resin composition particularly adapted for use as a film-forming composition in a cathodic electrodeposition process is disclosed. The resin composition comprises the reaction product of A. an epoxide and B. the reaction product of a ketone and an alkanolamine wherein the alkanolamine comprises a primary amine and a primary hydroxyl. The epoxide can be chain extended during the amine adducting reaction. The resin when salted and formed into an emulsion can be deposited in a cathodic electrodeposition process.

Another aspect of this invention is an aqueous cathodic electrodeposition bath utilizing the above-mentioned resin composition.

Another aspect of the present invention is a method of coating articles with a film-forming resin composition using a cathodic electrodeposition process wherein a cathodic electrodepositable amine-containing epoxide resin is mixed with a crosslinking agent, the resin is then salted with acid and solubilized in water to form an aqueous emulsion, the emulsion is then mixed with a pigment paste and deionized water to form an electrodeposition coating bath, the bath is contained in an electrically insulated tank containing an anode, an electrically conductive article is connected to a direct current electric circuit to act as a cathode, the article is immersed in the bath, and a direct electric current is passed across the article resulting in the deposition of a film of the resin and crosslinking agent and pigment paste upon the surfaces of the coated article, the coated article is then removed from the bath, and the coating is cured to a smooth, durable finish. The improvement comprises the use of a cathodic electrodepositable resin comprising a resin composition particularly adapted for use as a film-forming composition in electrodeposition processes comprising the reaction product of A. an epoxide, and, B. the reaction product of a ketone and an alkanolamine, wherein the alkanolamine comprises a primary amine and a primary hydroxyl.

Yet another aspect of the invention is a coated article manufactured by the above-mentioned process.

The foregoing, and other features and advantages of the present invention will become more apparent from the following description.

BEST MODE FOR CARRYING OUT THE INVENTION

The alkanolamines which can be used in the practice of this invention will comprise a primary monoamine and a primary alcohol. The primary monoamine section can be generically categorized as an alkyl amine. The primary alcohol group can be generically categorized as an alkyl alcohol. The alkanolamines are typically made by reductive amination of alcohols or by reduction of alkanolnitrile compounds. Examples of alkanolamines useful in the practice of this invention include ethanolamine, neopentanolamine, 2-hydroxy-2'-amino ethyl ether and 2-hydroxy-2'-(amino propoxy)ethyl ether. Particularly preferred alkanolamines are the polyether-alkanolamines which are also manufactured by reductive amination of alcohols and reductiion of nitriles. Examples of commercially available polyether alkanolamines useful in the practice of this invention include neopentanolamine manufactured by Eastman Chemical Products, Inc., Kingsport, TN, Diglycolamine TM manufactured by Texaco, Inc., Houston, TX and Polyglycolamine H-163 TM manufactured by Union Carbide, Corp., New York, NY.

The ketones useful in the practice of this invention are commercially available and are typically manufactured by the oxidation of secondary alcohols. Examples of ketones which can be used to form the ketimine-alcohols of this invention include methyl isobutyl ketone, methyl propyl ketone, cyclohexanone, methyl isoamyl ketone, and methyl amyl ketone. Methyl isobutyl ketone is particularly preferred.

In order to introduce the primary amine into the epoxy to form the epoxy/amine adducts of this invention, it is necessary to initially block the primary amine with a ketone. This is done by reacting sufficient amounts of ketone with sufficient amounts of alkanolamine at sufficient temperature for a sufficient amount of time to form the ketimine alcohol. Typically, for each mole of alkanolamine about 1 mole to about 5 moles of ketone are reacted, preferably about 1 mole to about 2 moles. The reaction is performed in a conventional reactor vessel at a temperature, typically about 220° F. to about 450° F., more typically about 250° F. to about 400° F. and preferably about 270° F. to about 320° F. The reaction time is typically about 2 hours to about 24 hours, preferably about 5 hours to about 10 hours.

The epoxides useful in the practice of this invention are the epoxides typically used in this art and comprise a resinous material containing at least one epoxy group per molecule.

A particularly useful class of epoxides are the glycidyl polyethers of polyhydric phenols.

Such epoxide resins are derived from an epihalohydrin and a dihydric phenol and have an epoxide equivalent weight of about 400 to about 4,000. Examples of epihalohydrins are epichlorohydrin, epibromohydrin and epiiodohydrin with epichlorohydrin being preferred. Dihydric phenols are exemplified by resorcinol, hydroquinone, p,p'-dihydroxydiphenylpropane (or Bisphenol A as it is commonly called), p,p'-dihydroxybenzophenone, p,p'-dihydroxydiphenyl, p,p'-dihydroxydiphenyl ethane, bis(2-hydroxynaphthy)methane, 1,5-dihydroxynaphthylene and the like with Bisphenol A being preferred. These epoxy resins are well known in the art and are made in desired molecular weights by reacting the epihalohydrin and the dihydric phenol in various ratios or by reacting a dihyric phenol with a lower molecular weight polyepoxide resin. Particularly preferred epoxy resins are glycidyl polyethers of Bisphenol A having epoxide equivalent weights of about 450 to about 2,000, more typically about 800 to about 1,600 and preferably about 800 to about 1,500.

The epoxides used in the practice of this invention will have a relatively high molecular weight, that is, the molecular weight will typically be about 900 to about 4,000, more typically about 1,600 to about 3,200, and preferably about 1,600 to about 2,800.

Another quite useful class of epoxides are produced similarly from novolak resins or similar polyphenol resins.

Also suitable are the epoxides comprising similar polyglycidyl ethers of polyhydric alcohols which may be derived from such polyhydric alcohols as ethylene glycol, diethylene glycol, triethylene glycol, 1,2-propylene glycol, 1,4-propylene glycol, 1,5-pentanediol, 1,2,6-hexanetriol, glycerol, bis(4-hydroxycyclohexyl) 2,2-propane and the like. There can also be used polyglycidyl esters of polycarboxylic acids, which are produced by the reaction of epichlorohydrin or similar epoxy compounds with an aliphatic or aromatic polycarboxylic acid such as oxalic acid, succinic acid, glutaric acid terephthalic acid, 2,6-naphthylane dicarboxylic acid, dimerized linolenic acid and the like. Examples are glycidyl adipate and glycidyl phthalate. Also useful are epoxides derived from the epoxidation of an olefinically unsaturated alicyclic compound. Included are diepoxides comprising in part one or more monoepoxides. These epoxides are nonphenolic and are obtained by the epoxidation of alicyclic olefins. For example, by oxygen and selected method catalysts, by perbenzoic acids, by acetaldehyde monoperacetate, or by peracetic acid. Among such polyepoxides are the epoxy alicyclic ethers and esters which are well known in the art.

Other epoxy-containing compounds and resins include nitrogeneous diepoxides such as disclosed in U.S. Pat. No. 3,365,471; epoxy resins from 1,1-methylene bis(5-substituted hydantoin), U.S. Pat. No. 3,391,097; bis-imide containing diepoxides, U.S. Pat. No. 3,450,711; epoxylated ammonomethyldiphenyl oxides, U.S. Pat. No. 3,312,664; heterocyclic N,N'-diglycidyl compounds, U.S. Pat. No. 3,503,979; amino epoxy phosphonates, British Pat. No. 1,172,916; 1,3,5-triglycidyl isocyanurates, as well as other epoxy-containing materials known in the art.

Although any conventional epoxy may be used it is preferable to modify the epoxy. Specifically, the modified epoxy resins used in the practice of this invention will comprise one of the aforementioned epoxy resin compositions chain extended with a water miscible or water soluble polyol, a fatty acid, or aliphatic monoepoxide.

The water soluble or water miscible polyols, used to optionally chain extend epoxy resins, include organic polyols containing at least one and preferably two alcohol primary hydroxyls. Mixtures of organic polyols may be used in the practice of this invention, as well as mixtures of organic polyols and primary mono primary alcohols. These organic polyols will have a molecular weight of about 200 to about 3,000, more typically about 300 to about 1,000, and preferably about 400 to about 700.

Water miscible is defined as the ability or tendency of the polyol to mix or blend uniformly with water. By water soluble is meant the ability or tendency of the polyol to blend uniformly with water.

The organic polyols which are used in the practice of this invention are those known in the art, e.g. polyols disclosed in U.S. Pat. No. 4,104,147 which is incorporated by reference.

The water soluble or water miscible polyols which are used to generate the modified epoxy resins of this invention include the aliphatic polyols, the aromatic polyols, alkylene polyols, butadiene polyols, and butadiene acrylonitrile polyols.

Specific examples of the organic polyols used in the practice of this invention include Tone 200 brand polyol manufactured by Union Carbide Corp., Carbowax PG 300 and Carbowax PG 400 polyols manufactured by Union Carbide Corp., SynFac 8007 and SynFac 8008 brand polyols manufactured by Milliken Chemical Co., Spartanburg, S.C., and Hycar HTBN brand polyol manufactured by B. F. Goodrich Chemical Corp., Cleveland, Ohio. A particularly preferred polyol is SynFac 8008 brand.

The modification of the epoxide, that is, the chain extension and corresponding increase of molecular weight, is accomplished by mixing the organic polyol with the epoxide in an organic solvent, such as toluene, methyl isolbutyl ketone xylene, etc., and reacting these products at a sufficient temperature for a sufficient amount of time in a conventional reactor in the presence of a catalyst to completely react the epoxide. Typically, the reaction temperature will be about 200° F. to about 350° F., more typically about 250° F. to about 320° F., preferably about 260° F. to about 300° F. Typically the reaction time is about 120 minutes to about 300 minutes, more typically about 160 minutes to about 260 minutes, preferably about 180 minutes to about 240 minutes.

Typically about 1.5 to about 3 epoxide equivalents of epoxide are reacted, more typically about 2 to about 2.5, preferably about 2 equivalents with one equivalent of polyol. Examples of suitable catalysts include benzyl dimethylamine, triethylamine, triphenol phosphine, boron trifluoride, dimethylcyclohexylamine, and dimethylethanolamine or any Lewis acid.

As previously mentioned, the initial step in preparing the epoxy/amine adducts of this invention is to form a ketimine alcohol by reacting a ketone with an alkanolamine. The introduction of the primary amine into the epoxy is done by charging into a conventional reactor vessel sufficient amounts of ketimine alcohol and sufficient amounts of epoxide to completely react the epoxide groups. The reaction is maintained for a sufficient time and a sufficient temperature to assure complete reaction. Typically, for each epoxide equivalent about 0.5 mole to about 1.5 moles of ketimine alcohol is reacted, more typically about 0.8 moles to about 1.2 moles of ketimine alcohol, and preferably about 0.9 mole to about 1.1 moles. The reaction time is typically about 3 hours to about 8 hours, more typically about 3 hours to about 5 hours, preferably about 4 hours. The reaction temperature is typically about 110° C. to about 170° C., more typically about 120° C. to about 160° C., preferably about 125° C. to about 150° C. Catalysts may be optionally included such as tertiary amine catalysts. A particularly preferred catalyst is benzyl dimethylamine.

Fatty acids which can be used, to optionally modify the epoxy/amine adducts used in the practice of this invention, are monocarboxylic acids containing about 4 to 22 carbon atoms. The fatty acids may be saturated or unsaturated. The fatty acids are typical of those in the art. Examples of such acids are caprylic acid, capric acid, stearic acid, benzoic acid, oleic acid, linoleic acid, linolenic acid and liconic acid. Such acids can be those derived from naturally occurring oils and which are named from the oil from which it is derived, e.g., linseed fatty acids, soya fatty acids, cottonseed fatty acids, cocoanut fatty acid and the like. A particularly preferred fatty acid is pelargonic acid.

The monoepoxides which can be used to optionally modify the epoxy/amine adducts used in the practice of this invention contain one 1,2-epoxide group per molecule and about 6 to about 24 carbon atoms per molecule. The monoepoxides used in the practice of this invention are typical of those known in the art such as the monoepoxides disclosed in U.S. Pat. No. 4,139,510 which is incorporated by reference.

Examples of monoepoxides are epoxidized hydrocarbons, epoxidized unsaturated fatty esters, monoglycidyl ethers of aliphatic alcohols and monoglycidyl esters of monocarboxylic acids. Examples of such monoepoxides are: epoxidized unsaturated hydrocarbons which contain 6 to about 24 carbon atoms, e.g., octylene oxide; decylene oxide, dodecylene oxide and nonadecylene oxide, epoxidized monoalcohol esters of unsaturated fatty acids wherein the fatty acids contain about 8 to about 18 carbon atoms and the alcohol contains 1 to 6 carbon atoms, e.g., epoxidized methyl oleate, epoxidized n-butyl oleate, epoxidized methyl palmitoleate, epoxidized ethyl linoleate and the like; monoglycidyl ethers of monohydric alcohols which contain 8 to 20 carbon atoms, e.g., octyl glycidyl ether, decyl glycidyl ether, dodecyl glycidyl ether, tetradecyl glycidyl ether, hexadecyl glycidyl ether and octadecyl glycidyl ether; monoglycidyl esters of monocarboxylic acids which contain 8 to 20 carbon atoms, e.g., the glycidyl ester of caprylic acid, the glycidyl ester of capric acid, the glycidyl ester of lauric acid, the glycidyl ester of stearic acid, the glycidyl ester of arachidic acid and the glycidyl esters of alpha, alpha-dialkyl monocarboxylic acids described in U.S. Pat. No. 3,178,454 which is incorporated by reference. Examples of such glycidyl esters are those derived from about 9 to about 19 carbon atoms, particularly Versatic 911 Acid, a product of Shell Oil Company, which acid contains 9 to 11 carbon atoms.

The monoepoxides or fatty acids are optionally reacted with the modified epoxy/amine adducts of this invention to improve the electrical insulating properties of the deposited electrodepositable resin compositions of this invention. In addition, these components improve the properties of the deposited coating such as flexibility, corrosion resistance, and hardness.

Sufficient quantities of modified epoxy/amine adducts are mixed with sufficient quantities of fatty acid or monoepoxide in an organic solvent such as xylene, or toluene in a conventional reactor vessel for a sufficient period of time at a sufficient temperature to complete the reaction. Typically about one mole of modified epoxy-polyamine adduct is reacted with the following amounts of fatty acid or monoepoxide.

When fatty acid is the reactant, typically about 0.5 moles to about 2.75 moles of fatty acid are reacted with the adduct, more typically about 1 mole to about 2.25 moles, and preferably about 1 mole to about 2 moles. The reaction temperature is typically about 300° F. to about 400° F., more typically about 325° F. to about 390° F., and preferably about 350° F. to about 375° F.; the reaction time is about 60 minutes to about 180 minutes, more typically about 60 minutes to about 140 minutes and preferably about 120 minutes, or until the acid value is reduced to below about 6.

When monoepoxide is the reactant, typically about 0.5 mole to about 2.25 moles of monoepoxide are reacted with the adduct, more typically about 1 mole to about 2.25 moles, preferably about 1 mole to about 2 moles. The reaction temperature is typically about 150° F. to about 300° F., more typically about 150° F. to about 280° F., and preferably about 150° F. to about 250° F.; reaction times are typically about 60 minutes to about 180 minutes, more typically about 60 minutes to about 150 minutes, and preferably about 60 minutes to about 100 minutes.

Various types of crosslinking agents are used in the electrodepositable coating compositions of this invention. Examples of the types of crosslinking agents which can be included are the aminoplast resins, phenoplast resins and the blocked or capped polyisocyanates. In the practice of this invention it is preferred to use the blocked organic polyisocyanates as crosslinking agents.

The typical aminoplast and phenoplast resins used in the art, as disclosed in U.S. Pat. No. 4,139,510, the disclosure of which is incorporated by reference, can also be used as crosslinking agents in the practice of this invention.

Suitable aminoplast resins are the reaction products of ureas and melamines with aldehydes, further etherified in some cases with an alcohol. Examples of aminoplast resin components are urea, ethylene urea, thiourea, melamine, benzoguanamine and acetoguanamine. Aldehydes useful to form aminoplast resins include formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea-formaldehyde resins, hexamethoxymethyl melamine, methylated polymeric melamine-formaldehyde resins, and butylated polymeric melamine-formaldehyde resins. Aminoplast resins and their method of preparation are described in detail in "Encyclopedia of Polymer Science and Technology", Volume 2, pages 1–19, Interscience Publishers (1965), the disclosure of which is incorporated by reference.

Phenoplast resins are the reaction products of phenols and aldehydes which contain reactive methylol groups. These compositions are be monomeric or polymeric in nature depending on the molar ratio of phenol to aldehyde used in the initial condensation reaction. Examples of phenols which can be used to make the phenolplast resins are phenol, o, m, or p-cresol, 2,4-xylenol, 3,4-xylenol, 2,5-xylenol, cardanol, p-tert-butyl phenol, and the like. Aldehydes useful in this reaction are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1–68, Interscience Publishers (1969), the disclosure of which is incorporated by reference.

Sufficient quantities of aminoplast and phenolplast resins are used in the cathodic electrocoat resin compositions to produce sufficient crosslinking of the modified epoxy-polyamine adduct-fatty acid reaction product upon baking or curing. Typically, the amount of aminoplast or phenolplast resin used in the practice of this invention is about 15 wt.% to about 45 wt.% of the total vehicle solids weight, more typically about 15 wt.% to about 40 wt.% and preferably about 20 wt.% to about 40 wt.%.

The preferred crosslinking agents used in the practice of this invention are the organic polyisocyanates and, in particular, the blocked polyisocyanates. The organic polyisocyanates and the blocking agents used in the practice of this invention are typical of those used in the art, e.g., U.S. Pat. No. 4,182,831 the disclosure of which is incorporated by reference.

Useful blocked polyisocyanates are those which are stable in the dispersion systems at ordinary room temperature and which react with the resinous product of this invention at elevated temperatures.

In the preparation of the blocked organic polyisocyanates, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the aromatic compounds such as m-phenylene, p-phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the triisocyanates such as triphenyl methane-4,4'4''-triisocyanate, 1,3,5-triisocyanate benzene and 2,4,6-triisocyanate toluene; and the tetraisocyanates such as 4,4'-diphenyl-dimethyl methane-2,2',5,5'tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g., ethylene glycol and propylene glycol, as well as other polyols such as glycerol, trimethylolpropane, hexanetriol, pentaerythritol, and the like as well as monoethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene and the like. These are generally called hydroxyl-terminated polyethers and can be linear or branched. Especially useful polyether polyols are those derived from reacting polyols such as ethylene glycol, diethylene glycol, triethylene glycol, 1,4,-butylene glycol, 1,3-butylene glycol, 1,6-hexanediol, and their mixtures; glycerol trimethylolethane, trimethylolpropane, 1,2,6- hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Preferred polyisocyanates include the reaction product of toluene diisocyanate and trimethylolpropane; additionally, the isocyanurate of hexamethylene diisocyanate.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethyl glycol monoethyl ether, ethyl glycol monobutyl ether and the like; the phenolic compounds such as phenol itself, substituted phenols in which the substituents do not adversely affect the coating operations. Examples include cresol, nitrophenol, chlorophenol and t-butyl phenol.

A preferred blocking agent is monopropyl ether of ethylene glycol. Additional blocking agents include tertiary hydroxyl amines, such as diethylethanolamine and oximes, such as methylethyl ketoxime, acetone oxime and cyclohexanone oxime, and caprolactam. A preferred oxime is methyl-n-amyl ketoxime.

The blocked polyisocyanates are formed by reacting sufficient quantities of blocking agent with sufficient quantities of organic polyisocyanate under reaction conditions conventional in this art such that no free isocyanate groups are present when the reaction has run its course.

Sufficient quantities of blocked polyisocyanate are incorporated into the electrodepositable coating compositions of this invention such that the deposited coating will be completely cured upon baking and there will be no free isocyanate groups remaining. Typically, about 20 wt.% to about 80 wt.% of blocked polyisocyanate is mixed with the modified epoxy resin, more typically about 30 wt.% to about 70 wt.%, preferably about 35 wt.% to about 68 wt.%.

The blocked polyisocyanates are mixed with the epoxy/amine reaction products of this invention by adding the blocked polyisocyanates to a reactor containing the modified epoxy/amine composition and mixing the charge for about one-half hour.

When the blocked polyisocyanates are used in the coating compositions of this invention, catalyst may be necessary to facilitate urethane formation. However, when using other crosslinking agents, catalysts are required such as dibutyl tin dilaurate, dibutyl tin oxide, dibutyl tin diacetate, etc. Sufficient quantities of catalyst are used to obtain the desired reaction rate.

In order to solubilize an amine containing epoxy resin composition, it is necessary to salt the reaction product with a water soluble acid. The acids which can be used include those known in the art such as formic acid, acetic acid, phosphoric acid, lactic acid, hydrochloric acid, etc. Sufficient quantities of the acid are mixed with said amine-containing epoxy resin compositions to solubilize or disperse the resin in water. One method in which the salting process is accomplished is by charging the amine-containing epoxy resin composition, an acid, coalescent solvents, water and surfactants conventional in the art into a reactor vessel, and mixing the reactor charge with a slow speed mixer until the reaction has been completed. In a preferred method, acid, water, etc. are initially added to a reactor vessel, then the resin is charged while the reactants are mixed with a slow speed mixer. Typically, the reaction temperature is about 25° F. to about 150° F., more typically about 100° F. to about 140° F., and preferably about 120° F. The reaction will be typically run for about 15 minutes to about 90 minutes, more typically about 25 minutes to about 80 minutes, and preferably 60 minutes.

Typically, about 0.1 Meq to about 0.8 Meq of acid is used per gram of solid resin, more typically about 0.2 Meq to about 0.7 Meq, and preferably about 0.2 Meq to about 0.5 Meq.

The electrodepositable cathodic coating compositions containing crosslinking agents of this invention are used in an electrodeposition process as an aqueous dispersion or principal emulsion. Sufficient quantities of the resin composition are used so that the concentration of the resin composition in an aqueous bath will produce a coating on an article of sufficient thickness so that upon baking the coating will have the desired characteristics such as smooth surface, high build, short coating time and low temperature cures. Typically, the concentration in an aqueous electrodeposition coating bath of the resin compositions of this invention are about 10 wt.% to about 40 wt.%, more typically about 10 wt.% to about 30 wt.%, and preferably about 15 wt.% to about 25 wt.%.

It should be noted that the cathodic electrodepositable resins are typically shipped by the manufacturer to the user as a salted aqueous dispersion or principal emulsion having a concentration of about 20 wt.% to about 36 wt.% of solids.

The cathodic electrodepositable coating baths of this invention are typically formed by mixing the solubilized (i.e., salted) cathodic electrodepositable resin compositions of this invention in concentrate form with water, although dry resin could be used. The electrodeposition bath may contain additional ingredients such as pigment paste, coalescent solvents, antioxidants, surfactants, etc., which are typically used in electrodeposition processes known in the art. Pigment compositions may be of any conventional type and are one or more of such pigments as the iron oxides, the lead oxides, strontium chromate, carbon black, titanium dioxide, talc, barium sulphite, barium yellow, cadmium red, chromic green, lead silicate, etc. Sufficient quantities of pigment are used to achieve the appearance characteristics desired such as gloss, reflectance, hue, tint and other desired characteristics. Typically, the amount of pigment used is expressed in a ratio of total pigment to total binder. Typically a pigment to binder ratio of about 0.1 to about 0.4 is used in the electrodepositable resin compositions of the present invention, more typically about 0.15 to about 0.35, preferably about 0.2 to about 0.3. Pigment is typically added to the electrodeposition bath in paste form, i.e., predispersed in a composition comprising pigment, amine-containing epoxy resin, and surfactants.

The electrodeposition baths may contain coalescent solvents which are water soluble or partially water soluble organic solvents for the resinous vehicles used in the practice of this invention. The coalescent solvents used in the practice of this invention are those typically used and known in the art.

Examples of such coalescent solvents include monomethyl ether ethylene glycol, monoethyl ether ethylene glycol, monobutylether, diethylene glycol monobutylether, ethanol, isopropanol, n-butenol, etc. Sufficient amounts of coalescent solvent are used so that a good emulsion resulting in a smooth deposited film is produced. Typically, the amount of coalescent solvent used will be about 0.5 wt.% to about 10 wt.% of the total weight of the coating bath, more typically about 1 wt.% to about 5 wt.%, and preferably about 1 wt.% to about 2 wt.%.

The electrodeposition process typically takes place in an electrically insulated tank containing an electrically conductive anode which is attached to a direct current source. The size of the tank will depend on the size of the article to be coated. Typically, the tank is constructed of stainless steel or mild steel lined with a dielectric coating such as epoxy impregnated fiberglass or polypropylene. The electrodepositable cathodic resinous coating compositions of this invention are typically used to coat articles such as automobile or truck bodies. The typical size of an electrodeposition bath tank used for this purpose is about 60,000 gallons to about 120,000 gallons.

Typically, the article to be coated is connected to the direct current circuit so that the conductive object acts as the cathode. When the article is immersed in the coating bath, flow of electrons from the cathode to the anode, that is, conventional current flow from the anode to the cathode, results in the particles of the dispersed cationic electrodepositable resin composition being deposited on the surfaces of the article. The particles of the dispersed resin composition are positively charged and are therefore attracted to the negative cathodic surface of the object to be coated. The thickness of coating deposited upon the object during its residence in the electric cathodic coating bath is a function of the cathodic electrodepositable resin composition, the voltage across the article, the current flux, the pH of the coating bath, the conductivity, the residence time, etc. Sufficient voltage will be applied to the coated article for a sufficient time to obtain a coating of sufficient thickness. Typically, the voltage applied across the coated article is about 50 volts to about 500 volts, more typically about 200 to about 350 volts, and preferably about 225 volts to about 300 volts. The current density is typically about 0.5 ampere per sq. ft. to about 30 amperes per sq. ft., more typically about one ampere per sq. ft. to about 25 amperes per sq. ft., and preferably about one ampere per sq. ft. The article to be coated typically remains in the coating bath for a sufficient period of time to produce a coating or film of sufficient thickness, having sufficient resistance to corrosion and flexibility. The residence time or holding time is typically about 1 minute to about 3 minutes, more typically about 1 minute to about 2½ minutes, and preferably about 2 minutes.

The pH of the coating bath is sufficient to produce a coating which will not rupture under the applied voltage. That is, sufficient pH to maintain the stability of the coating bath so that the resin does not kick-out of the dispersed state and to control the conductivity of the bath. Typically, the pH is about 4 to about 7 more typically about 5 to about 6.8, and preferably about 6 to about 6.5.

The conductivity of the coating bath will be sufficient to produce a coated film of sufficient thickness. Typically the conductivity will be about 800 micro mhos to about 3,000 micro mhos, more typically about 800 micro mhos to about 2,000 micro mhos, and preferably about 900 micro mhos to about 1,800 micro mhos.

The desirable coating thicknesses are sufficient to provide resistance to corrosion while having adequate flexibility. Typically, the film thicknesses of the coated objects of this invention will be about 0.4 mil to about 1.8 mils, more typically about 0.6 mil to about 1.6 mils, and preferably about 1.2 mils to about 1.4 mils.

The temperature of the coating bath is preferably maintained through cooling at a temperature less than about 86° F.

When the desired thickness of the coating has been achieved the coated object is removed from the electrodeposition bath and cured. Typically, the electrodeposited coatings are cured in a conventional convection oven at a sufficient temperature for a sufficient length of time to unblock the blocked polyisocyanates and allow for crosslinking of the electrodepositable resin compositions. Typically, the coated articles will be baked at a temperature of about 200° F. to about 600° F., more typically about 250° F. to about 375° F., and preferably about 275° F. to about 350° F. The coated articles will be baked for a time period of about 10 minutes to about 40 minutes, more typically about ten minutes to about 35 minutes, and preferably about 15 minutes to about 30 minutes.

It is contemplated that the coated articles of the present invention may also be cured by using radiation, vapor curing, contact with heat transfer fluids, and equivalent methods.

The smoothness of the cured coating is a function of the "flow" of the deposited coating composition. Flow is defined as the tendency of the electrodeposited coating composition to liquify during the curing operation and form a smooth cohesive film over the surface of a coated article prior to the onset crosslinking.

Typically the coated articles of this invention will comprise conductive substrates such as metal, including steel, aluminum, copper, etc., however, any conductive substrate having a conductivity similar to the aforementioned metals may be used. The articles to be coated may comprise any shape so long as all surfaces can be wetted by the electrodeposition bath. The characteristics of the article to be coated which have an effect on the coating include the shape of the article, the capacity of the surfaces to be wetted by the coating solution, and the degree of shielding from the anode. Shielding is defined as the degree of interference with the electromotive field produced between the cathode and the anode, thereby preventing the coating composition from being deposited in those shielded areas. A measure of the ability of the coating bath to coat remote area of the object is throwpower. Throwpower is a function of the electrical configuration of the anode and cathode as well as the conductivity of the electrodeposition bath.

The coatings of the coated articles of this invention exhibit smoothness, gloss, flexibility, high film build, durability, and resistance to corrosion. Smoothness and gloss are related to the flow of the electrodeposited cathodic resin. Durability, high film build, flexibility and resistance to corrosion are related to the chemical nature of the electrodeposited cathodic resin as well as the smoothness of the deposited coating. These coating compositions readily accept an automotive primer overcoat.

It should be noted that the articles which are coated by the coating compositions of this invention are typically automobile bodies which have been pretreated to remove impurities and contaminants in a phosphotizing bath.

The following examples are illustrative of the principles and practice of this invention, although not limited thereto. Parts and percentages where used are parts and percentages by weight.

EXAMPLE 1A

The ketimine of polyglycolamine H-163 (HO[C$_2$H$_4$O]$_2$C$_3$H$_6$NH$_2$), manufactured by Union Carbide Corp., New York, NY, was prepared by azeotroping water from a reaction mixture of 978 parts of polyglycolamine H-163 and 978 parts of methyl isobutyl ketone under heat and agitation until 108 parts of water is collected.

EXAMPLE 1B

The ketimine hydroxy-capped epoxy grind vehicle was prepared as follows. To a the reaction mixture, comprising 325 parts EPON 1002F(WPE=650), manufactured by Shell Chemical Co., Houston, TX, and 32 parts of methyl isobutyl ketone, was charged and dried by azeotroping. At a temperature of 290° F., 139 parts of the ketimine of Example 1A and 1.5 parts of benzyl dimethyl amine were added. The reaction was held at 300° F. for 6 hours, and then, 297 parts of a half-blocked TDI (a reaction product of 1454 parts of Triton X-102 (Rohm & Haas, Philadelphia, PA), 351 parts of 2,4 toluene diisocyanate, and 32 parts of methyl isobutyl ketone) were added to the reactor. The reaction was held at 235° F. for 1 hour. The mixture was thinned with 237 parts of ethylene glycol monobutyl ether.

EXAMPLE 1C

A pigment paste was prepared by grinding 117 parts of the grind vehicle of Example 1B, 10 parts of ethylene glycol monobutyl ether, 1.9 parts of acetic acid, 136 parts of deionized water, 39 parts of aluminum silicate, 183 parts of titanium dioxide, 17 parts of lead silicate, 4 parts of clay, and 11 parts of dibutyl tin oxide in a suitable mill. The mixture was ground for about 24 hours until a maximum particle size of about 12 microns was produced.

EXAMPLE 1D

The following components were charged into a suitable reactor vessel: 1658 parts of Epon 828 having an epoxy equivalent weight of 188; 473 parts of Bisphenol A; 583 parts of ethoxylated Bisphenol A having a hydroxy equivalent weight of 230 (Synfac 8009 from Milliken Chemical Co.), and 147 parts of toluene. The charge was heated 140° F. under a dry nitrogen blanket and 3.8 parts of benzyl dimethyl amine was added to the reactor vessel. The reaction mixture was further heated to 160° C., and held for 45 minutes; an additional 5.4 parts of benzyl dimethyl amine was added, and the mixture was held at 150° C. until the desired WPE (weight per epoxy) was achieved, then 1037 parts of toluene were added to the reactor to dilute the resulting adduct D.

EXAMPLE 1E

A conventional reactor equipped with an agitator, thermometer, nitrogen line and a condensor was charged with 900 parts of diethylene triamine. The diethylene triamine was slowly heated to 140° F. Then, 2869 parts of Example 1D were slowly added to the reactor during a one-hour time period. After the adduct of Example 1D was completely charged, the mixture was heated to 180° F. and held for one hour. Next, the excess amine in the reactor mixture was vacuum distilled, condensed and removed by applying a vacuum of 75 mmHg and slowly raising the temperature of the reactor charge to 500° F. over a 2.5 hour time period. The mixture was held at this temperature until no more distillate was coming out. The temperature was then lowered to 360° F. and 283 parts of Pelargonic acid along with 200 parts of xylene were added to the reactor. The resulting mixture was heated to 360° F. and held at reflux until the acid value was down to 6. Then the reaction mixture was cooled down to ambient temperature.

EXAMPLE 1F

The crosslinker was prepared by slowly charging 870 parts of trimethylopropane into a suitable reactor vessel containing 3387 parts of an 80/20 isomer mixture of 2,4-2,6 toluene diisocyanate, 1469 parts of methyl isobutyl ketone, and 2 parts of dibutyl tin dilaurate under agitation with a nitrogen blanket. The reaction was maintained at a temperature below 110° F. The charge was held an additional one and one-half hours at 110° F. and then heated to 140° F., at which time 2026 parts of ethylene glycol monopropyl ether were added. The charge was maintained at 210° F. to 220° F. for one and one-half hours until essentially all of the isocyanate moiety was consumed as indicated by infrared scan. The batch was then thinned with 2116 parts of methyl isobutyl ketone.

EXAMPLE 1G

The acrylic anticratering agent was prepared by charging 44 parts of butyl acrylic, 15 parts of hydroxyethyl acrylic, 15 parts of dimethylaminoethyl methacrylic, 2 parts of styrene, 1 part of octyl mercaptan, 4 parts of VAZO 67, and 3 parts of acetone to a refluxing mixture of 13 parts of methyl isobutyl ketone and 2 parts of acetone over a 4 hour period. After a 15 minute holding period, 0.14 parts of VAZO 67 and 1 part of methyl isobutyl ketone were added. The batch was maintained at the refluxing temperature for another hour.

EXAMPLE 1H

The principal emulsion was prepared by adding 324 parts of the resin of Example 1E, 172 parts of the crosslinker of Example 1F, 10 parts of the anti-cratering agent of Example 1G, 17 parts of propylene glycol monophenyl ether to 227 of deionized water and 7 parts of acetic acid under high agitation for one hour. An additional 246 parts of deionized water were added. After agitation for 3 days, organic solvents were driven off, i.e., the VOC was zero.

EXAMPLE 1I

An aqueous dispersion suitable for electrodeposition was prepared by mixing 1237 parts of the principal emulsion of Example 1H, 771 parts of deionized water, and 230 parts of the pigment paste of Example 1C. The dispersion had a pH of 6.6 and a total solid of 25%. A phosphated steel panel electrocoated at 275 volts for two minutes gave a smooth film of 1.3 mil thickness after a 325° F. bake for 25 minutes.

EXAMPLE 2A

The ketimine hydroxy-capped epoxy used in the principal resin was prepared as follows. The following components were charged into a suitable reactor vessel: 523 parts of EPON 828, 163 parts of ethoxylated Bisphenol A (Synfac 8009 from Milliken Chemical Co.), and 36 parts of toluene. The mixture was heated to 360° F. to remove any water present. The mixture was cooled to 300° F., and 128 parts of bisphenol A and one part of benzyldimethyl amine were added. The mixture was heated to 300° F. and held between 320° F.–350° F. for about one-half hour and then cooled to 290° F. Benzyldimethyl amine, 1.4 parts, was added. The reaction mixture was held at 290° F. for one hour, and 192 parts of diglycolamine ketimine were added. (Diglycolamineketimine was prepared by azeotroping 90 parts of water from the reaction mixture of 525 parts of Diglycolamine TM (HO $C_2H_4OC_2H_4NH_2$ by Texaco) and 525 parts of methyl isobutyl ketone). The reaction mixture was held at 290° F. for 3 more hours. The reaction mixture was thinned with 268 parts of methyl isobutyl ketone.

EXAMPLE 2B

The principal emulsion was prepared by adding 611 parts of the principal amino epoxy of Example 2A, 330 parts of the crosslinker of Example 1F, and 22 parts of the acrylic anticratering agent of Example 1G to 15 parts of acetic acid and 923 parts of deionied water under high agitation. The organic solvents were driven off after agitation for 5 days.

EXAMPLE 2C

The adduct 2C and the adduct 2D are the two intermediates for the grinding vehicle. The adduct was prepared by charging ethylene glycol monopropyl ether to 2,4-toluene diisocyanate under agitation with a dry nitrogen blanket. The reaction was maintained at a temperature below 100° F. The charge was held an additional one and one-half hours.

EXAMPLE 2D

In a suitable reactor vessel, 455 parts of Triton X-102 TM (an alkylaryl poly-ether alcohol manufactured by Rohm and Haas, Philadelphia, PA) and 51 parts of methyl isobutyl ketone previously azotroped to remove water, were added to 109 parts of 2,4 toluene diisocyanate. The reaction was maintained at 115° F. for 2 hours. Then 56 parts of dimethyl ethanolamine, were charged, and the reaction was maintained at 160° F. for one hour. Finally, 50 parts of ethylene glycol monobutyl ether, 75 parts of lactic acid, and 89 parts of deionized water were charged, and the reaction was held at 190° F. for one hour.

EXAMPLE 2E

The grinding vehicle was prepared by charging 88 parts of the adduct of Example 2C to a reaction vessel containing 206 parts of EPON 1002F (WPE-650 manufactured by Shell Chemical Co., Houston, TX) and 39 parts of methyl isobutyl ketone. The reaction temperature was maintained at 250° F. for one hour. Then, 186 parts of ethylene glycol monobutyl ether, and 381 parts of the adduct 2D were added. The batch was maintained at 180° F. for four hours.

EXAMPLE 2F

A pigment paste was prepared by grinding 203 parts of the grinding vehicle of Example 2E, 17 parts of ethylene glycol monobutyl ether, 274 parts of deionized water, 67 parts of aluminum silicate, 317 parts of $TiO_2$, 30 parts of lead silicate, 6 parts of carbon black, and 19 parts of dibutyl tin oxide in a steel ball mill for about 24 hours so that the particle size of the mixture was less than 12 microns. Then, 66 parts of deionized water was added.

EXAMPLE 2G

A dispersion suitable for use as an electrodeposition coating bath composed of 1718 parts of the emulsion of Example 2B, 1152 parts of deionized water, and 330 parts of the pigment paste of Example 2F was prepared by mixing the components in a suitable vessel. The dispersion had a H of 6.5 and total solids of 25%. After one week of agitation, all organic solvent was driven off from the bath. A phosphated steel panel electrocoated at 200 volts for two minutes gave a cured film of one mil thickness after a 325° F. bake.

The epoxy/amine adducts of the present invention can be used a principal resins or grind resins in an electrodeposition process. The novel single primary amine in the epoxy resin/amine adduct contributes to high film build and eliminates problems associated with high conductivity such as low rupture voltage. The epoxy resin/amine adduct differs from conventional cathodic electrodepositable resins in that a monoamine alcohol is used to incorporate the primary amine into the epoxy resin, and the oxirane ring reacts with a hydroxyl group rather than a secondary or primary amine as is conventional in the art. This results in the amine content of the cathodic electrodepositable resin being as low as possible and eliminates the disadvantages associated with high amine content which are known in this art. In addition, surprisingly and unexpectedly, the resin compositions of this invention can additionally be used as grind resins to form pigment pastes which are stable when dispersed in an electrodeposition coating bath.

Although this invention has been shown and described with respect to the detailed embodiments thereof, it will be understood by those skilled in the art that various changes in form and detail thereof may be made without departing from the spirit and scope of the claimed invention.

We claim:

1. A resin composition particularly adapted for use as a film-forming composition in a cathodic electrodeposition process, comprising the reaction product of (A) an epoxide; and (B) mono-amine and a primary hydroxyl.

2. The composition of claim 1 additionally containing a crosslinking agent.

3. The composition of claim 2 wherein the crosslinking agent is a blocked polyisocyanate comprising the reaction product of a polyisocyanate and a blocking agent.

4. The composition of claim 3 wherein the polyisocyanate comprises the reaction product of trimethylopropane and toluene diisocyanate and the blocking agent comprises ethylene glycol monopropyl ether.

5. The composition of claim 1 wherein the alkanolamine is selected from the group consisting of neopentanolamine, diglycolamine, and polyglycolamine.

6. The composition of claim 1 optionally chain extended with a compound selected from the group consisting of polyols, fatty acids and monoepoxides.

7. An aqueous cathodic electrodeposition coating bath comprising water, an acid solubilized amine-containing epoxy resin and a crosslinking agent, and a pigment paste, the improvement comprising utilizing as the resin composition the resin compositions of claims 1, 2, 3, 4, 5 or 6.

8. A method of coating articles with a film-forming resin composition using a cathodic electrodeposition process wherein a cathodic electrodepositable amine-containing epoxide resin is mixed with a cross linking agent, the resin is then salted with an acid and solubilized to form an aqueous emulsion, the aqueous principal emulsion is mixed with a pigment paste and water to form an electrodeposition bath, the bath is contained in an electrically insulated tank containing an anode, an electrically-conductive article is electrically connected to a direct current electric circuit to act as a cathode, the article is immersed in the bath wherein a DC current is passed across the article resulting in a deposition of a film of the resin and crosslinking agent and pigment paste upon the surfaces of the article, the article is removed from the bath, and then the coating is cured, the improvement comprising utilizing as the cathodic electrodepositable amine-containing epoxide resin composition a resin composition comprising the reaction of (A) an epoxide; and (B) the reaction product of a ketone and an alkanolamine, wherein the alkanolamine comprises a primary monoamine and a primary hydroxyl.

9. The process of claim 8 wherein the resin composition contains a crosslinking agent which is a blocked polyisocyanate comprising the reaction product of a polyisocyanate and a blocking agent.

10. The process of claim 8 wherein the polyisocyanate comprises the reaction product of trimethylopropane and toluene diisocyanate and the blocking agent comprises ethylene glycol monopropyl ether.

11. The process of claim 8 wherein the polyether alkanolamine is selected from the group consisting of neopentanolamine, diglycolamine, and polyglycolamine.

12. The process of claim 1 wherein the epoxide resin is optionally chain extended with a compound selected from the group consisting of fatty acids, polyols and monoepoxides.

13. A pigment paste comprising pigment and the resin composition of claims 1, 2, 3, 4, 5 or 6.

14. A coated article having a cathodic electrodeposited coating manufactured by a method of claims 8, 9, 10, 11 or 12.

* * * * *

UNITED STATES PATENT AND TRADEMARK OFFICE
CERTIFICATE OF CORRECTION

PATENT NO. : 4,596,842

DATED : June 30, 1986

INVENTOR(S) : Ding-Yu Chung; Tapan K. DebRoy

It is certified that error appears in the above-identified patent and that said Letters Patent is hereby corrected as shown below:

In the Claims, column 16, lines 43-46, Claim 1 should read as follows:

-- 1. A resin composition particularly adapted for use as a film forming composition in a cathodic electrodeposition process, comprising the reaction product of (A) an epoxide and (B) the reaction product of a ketone and alkanolamine, wherein the alkanolamine comprises a primary mono-amine and a primary hydroxyl. --

Signed and Sealed this

Twenty-eighth Day of October, 1986

[SEAL]

Attest:

DONALD J. QUIGG

Attesting Officer     Commissioner of Patents and Trademarks